E. NINFELDT.
BALING PRESS.
APPLICATION FILED FEB. 28, 1910.

963,383.

Patented July 5, 1910.

2 SHEETS—SHEET 1.

Witnesses:

Inventor
Emil Ninfeldt.
per John E. Stryker
Attorney.

E. NINFELDT.
BALING PRESS.
APPLICATION FILED FEB. 28, 1910.

963,383.

Patented July 5, 1910.
2 SHEETS—SHEET 2.

Witnesses:
K. H. Hansen
H. H. Flor

Inventor
Emil Ninfeldt.
per John E. Stryker
Attorney.

UNITED STATES PATENT OFFICE.

EMIL NINFELDT, OF SOUTH ST. PAUL, MINNESOTA.

BALING-PRESS.

963,383.  Specification of Letters Patent.  Patented July 5, 1910.

Application filed February 28, 1910. Serial No. 546,493.

*To all whom it may concern:*

Be it known that I, EMIL NINFELDT, a citizen of the United States, residing at South St. Paul, in the county of Dakota and State of Minnesota, have invented a new and useful Improvement in Baling-Presses, of which the following is a specification.

My invention relates to improvements in baling presses. Its object is to increase the efficiency and speed of operation of such presses.

My attachment, which is applied to the reciprocating member of the hopper or condensing chamber of the press, consists essentially of a spring rake head journaled in brackets carried by said member, and my invention consists broadly of this attachment in combination with a press having a reciprocating feeder and a hopper or condensing chamber of the type mentioned.

I make no claim of novelty to the drive mechanism of a baling press or to any particular form of condensing chamber and feeder *per se*.

Figure 1:
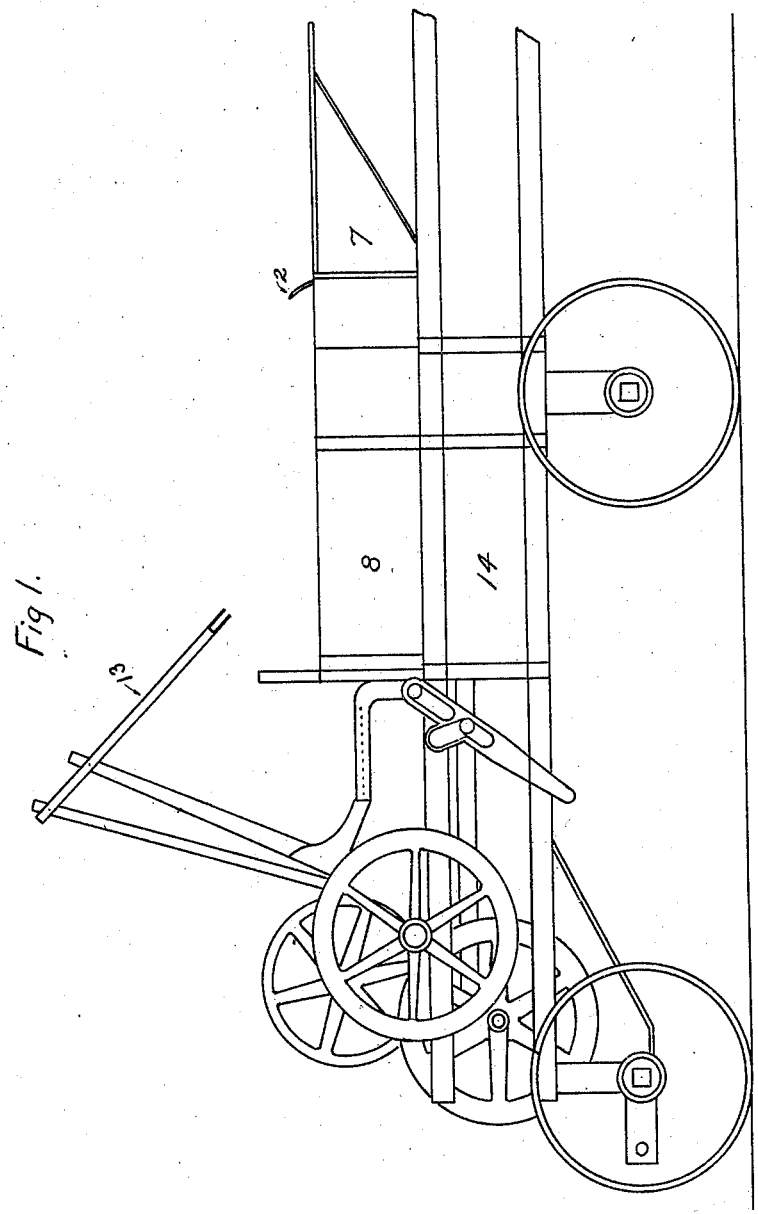
Figure 2:
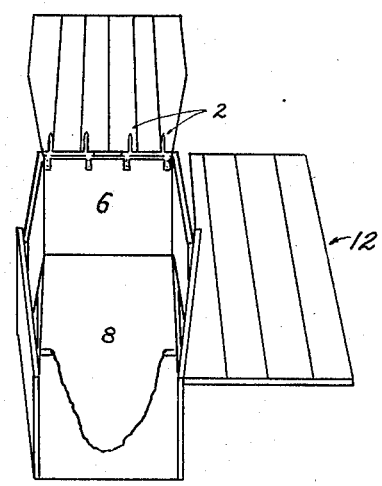
Figure 3:
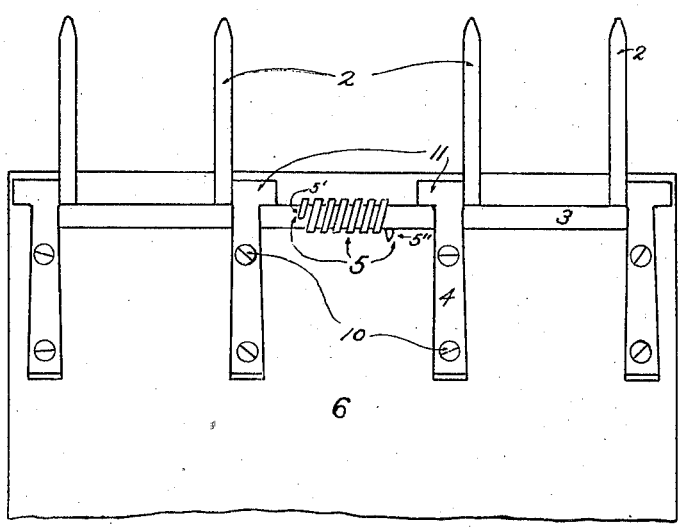
Figure 4:
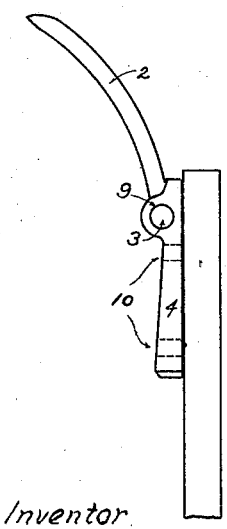

Figure 1 is a diagrammatic side elevation of a baling press with my attachment in place. Fig. 2 is a perspective view of the condensing chamber with my attachment thereon; Fig. 3 is a detail front elevation of the spring rake attached to the end board of the movable member of the condensing chamber; Fig. 4 is a side view of the same; and Fig. 5 is also a detail showing the teeth in normal and depressed position, the latter being indicated by dotted lines.

My rake head, comprising teeth 2, a cross bar 3, into which the teeth are rigidly inserted or otherwise suitable fastened, brackets 4 in which the cross bar is journaled, and a helical spring 5 surrounding the cross bar, one end, 5', of the spring being fastened to said bar, and the other, 5", to the end board 6 of the reciprocating member 7, of the condensing chamber 8. The brackets 4 are provided with perforations 9, in which the bar 3 is journaled, and these brackets are attached to the inner side of the end of the movable member 7 of the condensing chamber by screws or other suitable means 10, so that the perforations may be placed in horizontal alinement adapted to receive the cross bar. The upper ends of these brackets are formed with side flanges 11 against which the teeth of the rake rest when in normal position. The rake is held normally in this position by the spring 5.

The reciprocating part 7 of the condensing chamber 8 and the feeder fork 13 are arranged and driven in the usual manner and by the ordinary well-known means. As now commonly used, special effort on the part of the attendant is required to force the hay or straw thrown into the condensing chamber 8 down into said chamber 8 so that it may be carried into the baling chamber 14 by the feed fork 13. In ordinary practice, a considerable portion of the hay or straw remains above the movable member 7 of the condensing chamber 8 at each stroke and is not carried down into the baling chamber 14 until a subsequent reciprocation of the condenser and feed fork. My purpose is to rake this surplus hay or straw into position to be acted upon by the feed fork so that it may be forced into the baling chamber. I thus greatly reduce the work of the attendant and increase the rapidity with which the material may be baled.

Figure 5:
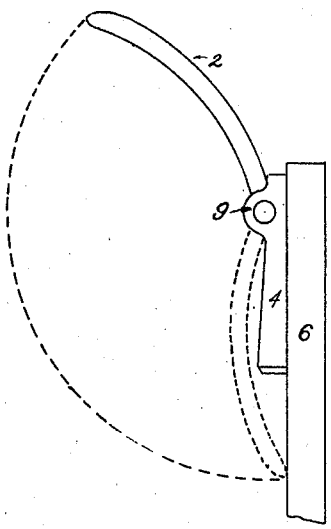

In operation, the hay, straw or other material is thrown into the condensing chamber by an attendant who usually stands upon the platform 12, and when the reciprocating member 7 makes its forward stroke, the rake is carried forward with it, forcing the material forward and downward, and when the feeder 13 makes its downward stroke, the material is carried with it, the rake head turning in its bearings as shown in Fig. 5, when freed from the material. The rake thus returns to its normal position and is in readiness for another forward stroke of the reciprocating member of the condensing chamber.

Having described my invention, what I claim as new and desire to protect by Letters Patent is:

1. In a baling press provided with a feed fork, a condensing chamber having a reciprocating member, a rake head journaled in brackets carried by said reciprocating member and held in normal position by a spring.

2. In a baling press, the combination with a condensing chamber, having a reciprocating member and a stationary member, of an oscillatable rake head carried by said reciprocating member and held in normal position by a spring.

3. In a baling press of the class described, a condensing chamber, having a reciprocating member, a rake journaled in brackets carried by said member, and a helical spring connected at one end to said rake and at the other to said reciprocating member.

4. In a baling press of the class described, a condensing chamber, having a reciprocating member, an oscillatable rake journaled on said member, and means for returning the rake to normal position after each reciprocation of said member.

In testimony whereof, I have signed my name to this specification in the presence of two subscribing witnesses.

EMIL NINFELDT.

Witnesses:
K. H. Hansen,
J. E. Stryker.